US012351722B2

(12) United States Patent
Marcaccioli et al.

(10) Patent No.: US 12,351,722 B2
(45) Date of Patent: Jul. 8, 2025

(54) CERAMIC INK FOR INKJET DIGITAL PRINTING

(71) Applicants: FLOORING INDUSTRIES LIMITED, SARL, Bertrange (LU); SICER S.P.A., Ubersetto di Fiorano Modenese (IT)

(72) Inventors: Sergio Marcaccioli, Ubersetto di Fiorano Modenese (IT); Christian Menato, Ubersetto di Fiorano Modenese (IT); Mariano Paganelli, Sassuolo (IT)

(73) Assignees: UNILIN BV, Wielsbeke (BE); SICER S.P.A., Ubersetto di Fiorano Modenese (IT)

( * ) Notice: Subject to any disclaimer, the term of this patent is extended or adjusted under 35 U.S.C. 154(b) by 1052 days.

(21) Appl. No.: 17/279,360

(22) PCT Filed: Sep. 11, 2019

(86) PCT No.: PCT/IB2019/057653
§ 371 (c)(1),
(2) Date: Mar. 24, 2021

(87) PCT Pub. No.: WO2020/065429
PCT Pub. Date: Apr. 2, 2020

(65) Prior Publication Data
US 2021/0395545 A1    Dec. 23, 2021

(30) Foreign Application Priority Data

Sep. 24, 2018  (IT) .................. 102018000008841

(51) Int. Cl.
*C09D 11/322*     (2014.01)
*C09D 11/38*      (2014.01)

(52) U.S. Cl.
CPC ............ *C09D 11/322* (2013.01); *C09D 11/38* (2013.01)

(58) Field of Classification Search
CPC .............. C09D 11/322; C09D 11/38; C04B 2111/00491; C04B 2111/82; C04B 41/009; C04B 41/52; C04B 41/86; C04B 41/89
See application file for complete search history.

(56) References Cited

U.S. PATENT DOCUMENTS

| | | | |
|---|---|---|---|
| 9,765,228 B2 | 9/2017 | Aparisi Ventura et al. | |
| 2006/0178446 A1* | 8/2006 | Bedat | C09D 11/03 106/31.86 |
| 2015/0252171 A1 | 9/2015 | Molnar et al. | |
| 2016/0319143 A1 | 11/2016 | Fornara et al. | |
| 2019/0022601 A1* | 1/2019 | Okamura | B01D 69/087 |
| 2019/0196327 A1* | 6/2019 | Kamimura | G03F 7/16 |
| 2021/0028444 A1* | 1/2021 | Laine | H01M 4/505 |

FOREIGN PATENT DOCUMENTS

| | | | | |
|---|---|---|---|---|
| CN | 103232748 A | * | 8/2013 | |
| CN | 103787693 A | | 5/2014 | |
| CN | 105176196 A | | 12/2015 | |
| CN | 105838146 A | | 8/2016 | |
| CN | 105968957 A | | 9/2016 | |
| EP | 2365361 A1 | | 9/2011 | |
| EP | 2594617 A2 | | 5/2013 | |
| EP | 2918560 A1 | | 9/2015 | |
| ES | 2289916 A1 | * | 2/2008 | ............... C09C 1/62 |
| WO | 2016042097 A1 | | 3/2016 | |
| WO | 2016185416 A1 | | 11/2016 | |
| WO | 2016208493 A1 | | 12/2016 | |
| WO | WO-2020003901 A1 | * | 1/2020 | |

OTHER PUBLICATIONS

"Acetyl Tributyl Citrate." PubChem, U.S. National Library of Medicine, pubchem.ncbi.nlm.nih.gov/compound/Acetyl-tributyl-citrate. Accessed Feb. 9, 2024. (Year: 2024).*
English machine translation of CN-103232748-A (Year: 2013).*
English machine translation of ES-2289916-A1 (Year: 2008).*
NIST Office of Data and Informatics. "Triethyl Citrate." PubChem, National Institute of Standards and Technology, webbook.nist.gov/cgi/cbook.cgi?ID=77-93-0. Accessed Feb. 9, 2024. (Year: 2024).*
English machine translation of WO-2020003901-A1 (Year: 2020).*
Search Report and Written Opinion from corresponding Italian Application No. 201800008841, May 10, 2019.
International Search Report and Written Opinion from PCT Application No. PCT/IB2019/057653, Nov. 13, 2019.

* cited by examiner

*Primary Examiner* — Jennifer A Smith
*Assistant Examiner* — Jeffrey Eugene Barzach
(74) *Attorney, Agent, or Firm* — Workman Nydegger

(57) ABSTRACT

Ceramic ink for digital printing comprising a solid part provided with at least one ceramic component and a liquid part provided with at least one first vehicle, wherein said first vehicle is selected from the group comprising: esterified terephthalates, cyclohexane dicarboxylates, citrates, trimethylolpropane esters, fatty acid esters of aromatic alcohols.

11 Claims, No Drawings

CERAMIC INK FOR INKJET DIGITAL PRINTING

BACKGROUND

The present invention relates to a ceramic ink for inkjet digital printing. More particularly, the invention relates to an ink for the digital decoration of articles made of ceramic material that undergo thermal treatment at high temperatures, for example such as tiles, plates, bathroom and kitchen worktops and sanitary ware.

As is known, in the last two decades inkjet digital printing has become established as the reference technology for the decoration of ceramic articles, especially plates and tiles for floors and coverings. This technology employs inks comprising a solid part, formed primarily of pigment and ceramic materials, and a liquid part, primarily of an organic nature, able to convey the dry part during the printing step.

U.S. Pat. No. 9,765,228 B2 and CN 103787693 A describe ceramic inks in which the wet part comprises glycol ether, for example ethylene glycol or propylene glycol. WO2016/208493 describes inks in which the liquid part is formed primarily of esterified fatty acids, of natural origin. Esters have gradually replaced the glycol ethers for the production of inks because they make it possible to improve printing performance as they are less liable to drying during the actual printing step. Other substances used for forming the liquid phase are naphthalene and isoparaffins as described in US2016/0319143.

However, use of all of the aforementioned substances involves the formation of bad odours both in the work environment, in particular near the printer, and outside the manufacturing plant. Moreover, during the firing step that takes place in all ceramic processes, these substances may decompose, with formation of harmful substances, for example such as aldehydes and VOCs (volatile organic compounds). In particular, the glycol ethers may easily lead to formation of VOCs, while the esters of fatty acids tend to decompose at quite low temperatures, between 100 and 200° C., with subsequent formation of aldehydes inside the kiln.

As a solution to this problem, WO 2016042097 A proposes the partial replacement of organic vehicles with water. Although on the one hand this solution makes it possible to reduce the odorous and harmful emissions dramatically, on the other hand it has a negative impact on printing performance. Water-based inks in fact tend to dry much more easily compared to inks with an organic vehicle and this leads to obstruction of the nozzles of the printing heads with consequent deterioration of printing quality as well as damage to the head itself. To improve the printing performance of water-based inks, use is made of conditioners installed upstream of the printer, which are able to cool the surface of the tile before printing so as to slow down evaporation of the water.

WO 2016/185416 A1 proposes an alternative solution in which the tiles are glazed and printed before drying so as to guarantee evaporation of the liquid part of the ink at moderate temperatures that do not cause degradation of the molecules into odorous and harmful substances. However, this solution is effective only provided that the amount of ink to be deposited on the tile is limited, and consequently is only suitable for the production of some products, and not for all the digital applications used today.

Therefore, as taught by the prior art, to limit the harmful and odorous emissions, and at the same time maintain good printing performance, it becomes necessary to modify the tile manufacturing plant, as well as the associated production process and the range of products marketed.

SUMMARY

The present invention aims firstly to supply an alternative ceramic ink for inkjet digital printing which, according to some embodiments thereof, is intended to solve one or more of the problems of the prior art.

One aim of the present invention is to overcome the aforementioned drawbacks of the prior art, in the context of a simple, efficient solution of moderate cost. These aims are achieved by the features of the invention given in the independent claim. The dependent claims present preferred and/or particularly advantageous aspects of the invention.

DETAILED DESCRIPTION OF VARIOUS EMBODIMENTS

The present invention, according to a first independent aspect thereof, relates to a ceramic ink for digital printing comprising a solid part provided with at least one ceramic component and a liquid part provided with at least one first vehicle, in which said first vehicle comprises at least one component selected from the group comprising: esterified terephthalates, cyclohexane dicarboxylates, citrates. In fact, the ink thus comprises good rheological characteristics, which make it suitable for digital printing. Moreover, these substances are of very low volatility and therefore only evaporate when exposed, inside the firing kiln, to relatively high temperatures, so that they do not break down into harmful substances, or at least so as to limit the emission of such substances considerably. Moreover, these substances are characterized by a molecular structure that is more complex compared to the linear structure of the fatty acids and therefore possess greater chemical stability. These substances in fact break down by combustion at higher temperatures and over a wider temperature range compared to the traditional vehicles, for example esters of fatty acids, etc. In practice, the combustion reactions of such substances, and the associated products, are more defined so as to generate a limited amount of harmful and odorous emissions. A further advantage of these inks is that their use does not require the adoption of particular means from the technological viewpoint and can therefore be used with standard digital printers.

According to the preferred embodiment, the first vehicle may be of an organic nature, non-polar or with low polarity. Non-polar substances in fact make it possible to improve printing quality and limit the need for maintenance work on the printer. Substances that are polar, and therefore water-soluble, tend to mix with the vapour emitted from the tile during printing, forming a solution that is deposited on the head and proves difficult to clean and remove. Moreover, according to a preferred embodiment, said first vehicle may have a boiling point above 250° C., preferably above 300° C., even more preferably above 350° C., for example above 450°. In this solution, the first vehicle of the ink evaporates during the firing step only when it reaches a part of the kiln characterized by a hot, dry environment. In such conditions the first vehicle oxidizes almost completely without giving rise to odorous or harmful substances, apart from the normal combustion products, carbon dioxide and carbon monoxide. For example, in these conditions the hydrolysis reaction is hampered, so that there is no formation of alcohols, which may subsequently oxidize to aldehydes.

Preferably, the first vehicle may comprise a molecular weight above 190 g/mol, for example above 250 g/mol, preferably above 300 g/mol. It is moreover preferable for the molecular weight of the first vehicle to be less than 700 g/mol, for example less than 600 g/mol, preferably less than 500 g/mol. In fact, although on the one hand the molecular weight helps in part to determine the boiling point of the first component, i.e. a high boiling point corresponds to a high molecular weight, on the other hand it helps to determine the viscosity of said first vehicle, and it is therefore necessary to identify the right balance between volatility and rheological behaviour of the ink.

According to a preferred embodiment, the first vehicle may have a kinematic viscosity at 40° C. between 1 cSt and 40 cSt, for example between 2 cSt and 30 cSt, preferably between 3 cSt and 20 cSt. It should be noted that identifying the correct value of viscosity of the first vehicle makes it possible to maximize the amount thereof so as to minimize the amount of other components of the liquid part able to regulate the rheological behaviour of the ink but which may cause the formation of odorous and/or harmful substances.

According to the preferred embodiment the amount of the first vehicle may represent, relative to the total weight of the ink, at least 10 wt %, for example at least 30%, preferably at least 50%.

According to a first preferred embodiment of the invention, the first vehicle comprises at least one esterified terephthalate, or a mixture of esterified terephthalates. Such substances have a general form of the type indicated in Formula 1:

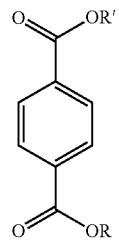

Formula 1 where R and R' may comprise aliphatic and/or branched groups. Note that according to some embodiments the groups R and R' may firstly be identical. Examples of possible aliphatic groups are methyl, ethyl, butyl, pentyl, hexyl, heptyl, octyl, nonyl groups, etc. Examples of esterified terephthalates may be: dimethyl terephthalate (DMT), diethyl terephthalate, dipropyl terephthalate, diallyl terephthalate, dibutyl terephthalate, dipentyl terephthalate (DPT), diisopentyl terephthalate, dihexyl terephthalate, diheptyl terephthalate, dioctyl terephthalate (DOTP or DEHT), di-2-ethylhexyl terephthalate, dinonyl terephthalate, didecyl terephthalate, bis-5-hydroxypentyl terephthalate, 3-hexylpentyl terephthalate, butyl-3-hexylpentyl terephthalate, 4-methylpentyl-2-propyl terephthalate, ethyl-3-hexyl terephthalate, 3-methylbutyl-2-pentyl terephthalate, 4,4-dimethylpentyl-3-pentyl terephthalate, 2-methylbutylpentyl terephthalate, di(2-methylbutyl) terephthalate. The inventors found, surprisingly, that the esterified terephthalates have suitable rheological properties for use as inks and at the same time have high volatility as well as reactivity at high temperatures that allow degradation by combustion primarily into carbon dioxide, carbon monoxide or other components that are non-toxic or produce little odour. In particular, there is very limited emission of aldehydes and formaldehydes. Note that such substances are known to be plasticizers in the polymer materials industry, but their use as inks is unknown.

According to a second preferred embodiment of the invention, the first vehicle comprises at least one cyclohexane carboxylate or a mixture of cyclohexane carboxylates. Such substances have a general form of the type indicated in Formula 2:

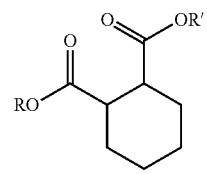

Formula 2 where R and R' may comprise aliphatic and/or branched groups. Note that according to some embodiments the groups R and R' may firstly be identical. Examples of possible aliphatic groups are methyl, ethyl, butyl, pentyl, hexyl, heptyl, octyl, nonyl groups, etc. Examples of esterified cyclohexane dicarboxylates may be: dimethyl cyclohexane-1,2-dicarboxylate, diethyl cyclohexane-1,2-dicarboxylate, dipropyl cyclohexane-1,2-dicarboxylate, diallyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, diheptyl cyclohexane-1,2-dicarboxylate, dioctyl cyclohexane-1,2-dicarboxylate, di-2-ethylhexyl terephthalate, dinonyl cyclohexane-1,2-dicarboxylate, diisononyl cyclohexane-1,2-dicarboxylate, didecyl cyclohexane-1,2-dicarboxylate, diundecyl cyclohexane-1,2-dicarboxylate. The inventors found, surprisingly, that the cyclohexane carboxylates have suitable rheological properties for use as inks and at the same time have high volatility as well as reactivity at high temperatures that allow degradation by combustion primarily into carbon dioxide, carbon monoxide or other components that are non-toxic or produce little odour. In particular, there is very limited emission of aldehydes and formaldehydes. Note that such substances are known to be plasticizers in the polymer materials industry, but their use as inks is unknown.

According to a third preferred embodiment of the invention, the first vehicle comprises at least one citrate or a mixture of citrates. Such substances have a general form of the type indicated in Formula 3:

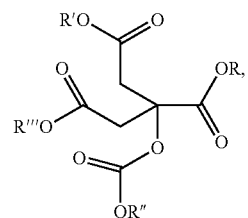

Formula 3 where R, R', R" and R'" may comprise aliphatic and/or branched groups. Note that according to some embodiments the groups R, R', R" and R'" may firstly be identical. Examples of possible aliphatic groups are methyl, ethyl, butyl, pentyl, hexyl, heptyl, octyl, nonyl groups, etc. Examples of citrates may be: acetyl tributyl citrate (ATBC), acetyl trihexyl citrate, O-acetyl tris(2-ethylhexyl) citrate, butyryl trihexyl citrate, triethyl acetyl citrate. The inventors found that the citrates have suitable rheological properties for use as inks, and at the same time have high volatility as well as reactivity at high temperatures that allow degradation by combustion primarily into carbon dioxide, carbon monoxide or other components that are non-toxic or produce little odour. Note that such substances are known to be plasticizers in the polymer materials industry, but their use as inks is unknown.

According to a fourth preferred embodiment of the invention, the first vehicle comprises at least one trimethylolpropane esters (also indicated as fatty acid esters of polyhydric alcohols), or a mixture of trimethylolpropane esters. Such substances have a general form of the type indicated in Formula 4:

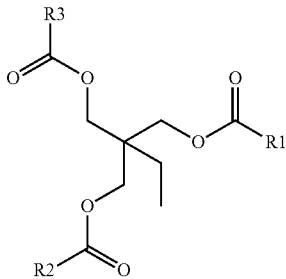

Formula 4 where R1 and R2 and R3 may comprise aliphatic and/or branched groups. Note that according to some embodiments the groups R2 and R2, R3 may firstly be identical. Examples of possible aliphatic groups are methyl, ethyl, butyl, pentyl, hexyl, heptyl, octyl, nonyl groups, etc. Examples of esterified terephthalates may be: 1,1,1, tris-(hydroximethyl)-propane triheptanoate, 1,1,1, tris-(hydroximethyl)-propano tricocoate, 1,1,1, tris-(hydroximethyl)-propane trioleate, 1,1,1, tris-(hydroxiethyl)-propane triheptanoate, 1,1,1, tris-(idrossipropil)-propane triheptanoate, 1,1,1-Trimethylolethane valerate, 1,1,1-Trimethylolethane trilaurate, 1,1,1-Trimethylolethane tricaprylate, 1,1,1-Trimethylolethane tripelargonate. The inventors found, surprisingly, that the trimethylolpropane esters have suitable rheological properties for use as inks and at the same time have high volatility as well as reactivity at high temperatures that allow degradation by combustion primarily into carbon dioxide, carbon monoxide or other components that are non-toxic or produce little odour. In particular, there is very limited emission of aldehydes and formaldehydes.

According to a fifth preferred embodiment of the invention, the first vehicle comprises at least one fatty acid esters of aromatic alcohols (also indicated as esters of aromatic alkoxylated polyhydric alcohols and carboxylic acids), or a mixture of fatty acid esters of aromatic alcohols. Such substances have a general form of the type indicated in Formula 5:

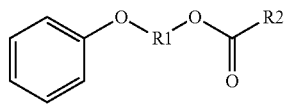

Formula 5 where R1 and R2 may comprise aliphatic and/or branched groups. Note that according to some embodiments the groups R1 and R2 may firstly be identical. Examples of possible aliphatic groups are methyl, ethyl, butyl, pentyl, hexyl, heptyl, octyl, nonyl groups, etc. Examples of esterified terephthalates may be: 2-phenoxyethyl octanoate, 2-phenoxymethyl octanoate; 2-fenossietil-eptanoato; 2-phenoxyethyl heptanoate; 2-phenoxyethyl nonanoate; 2-phenoxyethyl decanoate; 2-phenoxypropyl octanoate; 2-phenoxybuthyl octanoate; methyl 4-phenoxybutanoate; isopropyl 4-phenoxybutanoate; 2-phenoxyethyl propionate; 2-phenoxyethyl butyrate; 2-phenoxyethyl valerate; 2-phenoxyethyl 3-methylbutanoate; 2-phenoxyethyl octanoate; 2-phenoxyethyl docosanoate; 2-phenoxyethyl pentadecanoate; 2-phenoxyethyl palmitate. The inventors found, surprisingly, that the trimethylolpropane esters have suitable rheological properties for use as inks and at the same time have high volatility as well as reactivity at high temperatures that allow degradation by combustion primarily into carbon dioxide, carbon monoxide or other components that are non-toxic or produce little odour. In particular, there is very limited emission of aldehydes and formaldehydes.

According to a sixth preferred embodiment the first vehicle may be formed from any combination or mixture of the substances described with reference to the first, second, third, fourth or fifth preferred embodiment.

According to some embodiments the liquid part of the ink may also comprise a second vehicle. For example, the second vehicle may be configured for regulating the rheology of the liquid part of the ink. Advantageously, the second vehicle may comprise a substance or a mixture of organic substances that are non-polar or have low polarity. The second vehicle may be selected from the group comprising: glycol ethers, alcohols, lactates, glycol ether acetates, aldehydes, ketones, linear or cyclic aliphatic hydrocarbons, aromatic hydrocarbons, oils, alkyl carbonates, fatty acid esters, and polymers such as polyacrylates, polymethacrylates and block copolymers.

For example, the second vehicle may comprise dipropylene glycol n-butyl ether, tripropylene glycol n-butyl ether, dipropylene glycol methyl ether, 2-ethylhexylpalmitate, isopropyl laurate, ethylhexyl laurate, polyethylene glycol, di-2-ethylhexyl adipate.

Moreover, according to a preferred embodiment of said second vehicle it may have a boiling point above 200° C., preferably above 230° C., for example above 250° C. For example, the second vehicle may comprise a molecular weight above 50 g/mol, for example above 100 g/mol, preferably above 180 g/mol. It is moreover preferable for the molecular weight of the first vehicle to be less than 700 g/mol, for example less than 450 g/mol, preferably less than 250 g/mol. The second vehicle may have a viscosity at 40° C. between 1 cSt and 30 cSt, for example between 2 cSt and 20 cSt, preferably between 3 cSt and 10 cSt.

According to a preferred aspect of the invention, the second vehicle may represent at most 40 wt %, for example less than 30%, preferably less than 20%, relative to the total weight of the ink. In this way it is in fact possible to keep the possible volatile emissions of odorous or harmful substances within acceptable limits that do not pose any risks, at the same time guaranteeing high printing performance.

Moreover, the ink may comprise one or more additives for regulating physical and rheological properties of the ink. For example, the additives may be dispersants suitable for promoting dispersion of the solid part in the liquid part, surfactants for modifying the surface tension, viscosity modifiers, suspending agents, wetting agents, antifoaming agents, moistening agents, biocides, adhesion promoters, glue and/or organic colorants. For example, the additive may comprise glycol ethers, alcohols, lactates, aldehydes, ketones, oils, alkyl carbonates, esters, and polymers such as polyacrylates, polymethacrylates, polyamides and block copolymers.

According to a preferred aspect of the invention, the additive may represent at most 20 wt %, for example less than 10%, preferably less than 5%, relative to the total weight of the ink. In this way it is in fact possible to keep the possible volatile emissions of odorous or harmful substances within acceptable limits that do not pose any risks, at the same time guaranteeing high printing performance.

The solid part of the ink comprises at least one ceramic component. "Ceramic component" means substantially an inorganic, non-metallic component that can be consolidated at high temperatures. Preferably the ceramic component may comprise one or more inorganic pigments, able to colour the ink itself. For example, the inorganic pigments may impart a cyan, yellow, magenta, black, white, beige, or brown colour to the ink. By way of example, said pigments may comprise oxides, silicates and/or zirconates or other compounds of Fe, Co, Sn, Zn, Pr, Ni, Cr and other metals. The solid part of the ink may further comprise a frit or else a vitreous material able to promote the fusibility of the ink during firing and its consolidation on the surface of the ceramic product to be printed. Moreover, the solid part of the ink may comprise ceramic raw materials, for example, but not limited to, clays, kaolins, feldspars, silica, for example colloidal silica, zirconates, aluminates, silicate oxides, pyroxenes and other minerals in general. It is emphasized that the ink according to the invention may be used with any type of ceramic component, while remaining within the scope of the present invention.

According to a preferred embodiment, the solid part may represent at least 10 wt %, for example at least 20%, preferably at least 40%, relative to the total weight of the ink. The solid part may represent at most 70%, for example less than 60%, preferably less than 50%, relative to the total weight of the ink. It should be pointed out, moreover, that the solid part may comprise particles having a maximum dimension of 10 µm, for example 3 µm, preferably 1 µm. Moreover, the particles of the solid part may have a granulometric distribution with a value of Dv (10) below 0.40 µm, a value of Dv (50) below 0.70 µm, a value of Dv (90) below 0.94 µm, a value of Dv (97) below 1.2 µm, where it should be noted that Dv (X) below Y µm signifies that a fraction of particles equal to X % has a size below Y µm.

Note that the fact that the ink comprises a first vehicle having one or more of the features described in relation to the first independent aspect constitutes an inventive concept independently of other features of the ink, in particular independently of the fact that the ink comprises a solid part and of the fact that the solid part is a ceramic component. Therefore, for example, a further independent aspect of the invention provides an ink comprising at least one component selected from the group comprising: esterified terephthalates, cyclohexane dicarboxylates, citrates. According to this further independent aspect the ink may comprise an organic pigment or a resin, for example curable with UV radiation or with electrons, or any other substance and may be used in sectors other than the ceramic sector for the purpose of limiting odoriferous, volatile emissions.

Note that the fact that the ink may comprise a vehicle of low volatility, i.e. a boiling point above 250° C., preferably above 300° C., for example above 350° C. constitutes an inventive concept independent of the chemical nature of the vehicle. Therefore a second independent aspect of the invention of the ceramic ink for digital printing comprises a solid part provided with at least one ceramic component and a liquid part provided with at least one first vehicle, in which said first vehicle has a boiling point above 250° C. The ink further comprises one or more of the features described in relation to the first independent aspect.

It is noted, moreover, that the fact that the ink may comprise a vehicle having a molecular weight above 190 g/mol, for example above 250 g/mol, preferably above 300 g/mol constitutes an inventive concept independent of the chemical nature of the vehicle. Therefore a third independent aspect of the invention of the ceramic ink for digital printing comprises a solid part provided with at least one ceramic component and a liquid part provided with at least one first vehicle, in which said first vehicle has a molecular weight above 190 g/mol. The ink further comprises one or more of the features described in relation to the first independent aspect.

A fourth independent aspect of the invention envisages the use, as a vehicle in ceramic inks, of at least one component selected from the group comprising: esterified terephthalates, cyclohexane dicarboxylates, citrates. It is obvious that each of these substances may comprise one or more of the features described in relation to the first independent aspect.

A fifth independent aspect of the invention envisages a method for producing a manufactured ceramic product that envisages the steps of: providing a semi-finished ceramic product, printing at least one ceramic ink on a surface of said semi-finished ceramic product; thermally treating said semi-finished product at a temperature above 400° C. to obtain the ceramic manufactured product, in which the ink may comprise one or more of the features described with reference to the first, second and/or third independent aspect.

According to the preferred embodiment, the printing step envisages a step of inkjet digital printing of at least one ink according to a predetermined design or full-field on the whole surface to be decorated. The printing step may envisage the printing of one or more inks, for example of different colour, or the printing of inks of different colour and inks able to create visual effects, such as gloss or embossing. According to a preferred aspect of the invention, at least 0.1 g/m$^2$ of ink, for example at least 1 g/m$^2$, preferably 10 g/m$^2$ of ink, is printed during the printing step.

According to the preferred embodiment, the manufactured product is a tile, for flooring or covering, or a plate made of ceramic material. However, it should be noted that the manufactured product may be any object made of ceramic material, for example such as a laboratory, kitchen or bathroom worktop, or sanitary ware, tableware, a roofing-tile or a building material.

"Ceramic material" means any material obtained by high-temperature sintering of mineral powders, for example such as clays, feldspars, kaolin, quartz, carbonates, silicates, zirconium and/or aluminium oxide. Some examples of ceramic material may be porcelain stoneware, monoporous, white or red body ceramic, majolica, terracotta. However, for the purposes of the present invention, ceramic material also means glass and vitroceramic materials.

The step of providing the crude semi-finished ceramic product may comprise a step of moulding a mix comprising powders of ceramic raw materials and a binder such as water, for example. The mix may be moulded by static or continuous pressing, extrusion, casting or other moulding techniques. Said semi-finished product is usually described as "green" as it has not been fired at high temperatures and has not been dried, but still comprises a liquid binder.

Moreover, the method may comprise a step of drying the semi-finished product to remove part of the water from the mix, so as to give the mix good mechanical strength during the successive steps of the production process. Drying may take place on submitting the semi-finished product to a temperature above 100° C. Drying may take place before or after the step of printing the ink, preferably before.

The method may further comprise a step of applying one or more coating layers on the surface of the semi-finished product.

For example, the coating layers may comprise a primer coating configured for covering at least partially, preferably completely, the surface of the semi-finished product to be decorated, for example the upper surface of a tile. In this way, the primer coating can cover the colour of the semi-finished product as well as make said semi-finished product impervious, moreover it may be suitable for receiving the decoration on itself, or may define the base for the decoration. The primer coating may be white, beige, brown, grey or of any other colour. The primer coating preferably comprises an enamel and/or an engobe, or a smaltobbio ("enamel slip"). The primer coating may be applied dry or wet, by any coating technique, for example such as cascade coating, bell coating, by airless airbrushing, by flexography or screen printing. According to a preferred embodiment, the primer coating may be applied by inkjet printing of a ceramic ink as described with reference to the first independent aspect, in which the material of the coating represents, at least partly, the solid portion of the ink.

The coating layers may further comprise a protective coating that covers at least partially, preferably completely, the surface to be decorated and that is suitable for being positioned above the decoration, so as to cover it and protect it. Advantageously, the protective coating may be transparent or translucent so as to allow the underlying decoration to be seen. The protective coating may further comprise fillers or additives suitable for imparting new functionalities and/or for improving the surface properties of the decorative layer, for example antiwear, antislip, antibacterial or antistain properties. Moreover, the protective coating may be used in combination with the primer coating, or the protective coating may be applied on top of the primer coating. Preferably, the protective coating may comprise a glaze (transparent enamel) or a grit. The protective coating may be applied dry or wet, by any coating technique, for example such as cascade coating, bell coating, by airless airbrushing, by flexography or screen printing. According to a preferred embodiment, the protective coating may be applied by inkjet printing of a ceramic ink as described with reference to the first independent aspect, in which the material of the coating represents, at least partly, the solid portion of the ink.

According to the embodiment of the invention, the thermal treatment, also known as "firing", is carried out at a maximum temperature above 450° C., for example above 700° C., preferably above 1000° C. For example, in the case of production of tiles in porcelain stoneware, the thermal treatment takes place at a temperature of about 1200° C. or higher. The manufactured product is submitted to said treatment for a time that is a function of the geometry and dimensions of the product to be obtained. For example, in the case of ceramic tiles or plates the manufactured product is treated thermally for a time of less than 5 hours, for example less than 3 hours, preferably less than 1 hour.

According to the preferred embodiment, the method may envisage printing and thermally treating a crude semi-finished product, or one formed from a compact of unconsolidated powders. According to other embodiments, the method may envisage printing and thermally treating a semi-finished product that has been fired or already submitted beforehand to a thermal treatment at high temperature for consolidation of the powders.

Further features and advantages of the invention will become clear on reading the following detailed description, given for purposes of illustration, and non-limiting.

The details of two embodiment examples according to preferred embodiments of the invention are given below. In both examples, the ink was printed on 500 $m^2$ of crude tiles made of porcelain stoneware with the format 90×90 cm. The ceramic mix, in atomized form, was formed by static pressing. The crude tiles were then dried in a tunnel dryer to reduce the residual water content in the mix. According to other examples the crude tiles may be dried after glazing and decoration.

The dried crude tiles were then decorated by inkjet printing. In the preferred example the tiles were glazed by inkjet printing. In practice, in all the examples given hereunder, the solid part is formed from a ceramic enamel. The ink was printed on the whole field so as to maximize the amount thereof applied on the tiles and, in particular, 25 g/$m^2$ of ink was applied.

The tiles were then treated thermally in a roller kiln up to a temperature of 1205° C. for a cycle of 44 minutes.

Before each sampling for analysis of emissions, unprinted tile pieces were put in the kiln for a total time of 1 hour for zeroing emissions derived from pieces printed with an ink different from that under examination.

The emissions of VOCs (volatile organic compounds), non-methane VOCs, formaldehyde, total aldehydes, hydrofluoric acid and odoriferous substances were measured for each example. The emissions were measured by sampling in the chimney of the kiln, i.e. where the concentration of such substances is greatest.

The concentration of VOCs and non-methane VOCs in the fumes inside the chimney was measured in the chimney directly by FID (flame ionization detector).

Formaldehydes, aldehydes and hydrofluoric acid were sampled using suitable bubblers so as to be able to measure their concentration by specific analytical techniques in the laboratory, for example ion exchange chromatography, gas chromatography, and high-performance liquid chromatography (HPLC).

The odoriferous substances were sampled for laboratory analysis by olfactometry according to standard EN 13725: 2004. Some examples of odoriferous substances are nitrogen-containing compounds, sulphides, unsaturated compounds, oxygen-containing compounds, halogenated compounds, aldehydes, ketones, carboxylic acids, amines, alcohols, and groups containing sulphur. However, it should be emphasized that olfactometry does not determine the concentration of such substances, but only the olfactory perceptibility of such substances even when they are mixed together.

The results of the two examples were then compared with those of a test carried out on a sample 0, conducted in the same conditions, i.e. same amount of ink printed and same conditions of thermal treatment, but with a conventional ink comprising the formulation given in Table 1.

TABLE 1

| Component | Percentage by weight (%) |
| --- | --- |
| Solid part | 41 |
| First vehicle | 37 |
| Second vehicle | 16 |
| Additive | 6 | where the first vehicle is 2-ethylhexyl palmitate. This vehicle comprises a boiling point equal to 414° C., molecular weight equal to 369 g/mol and viscosity at 40° C. equal to 7.6 cSt.

The second vehicle is dipropylene glycol n-butyl ether (DOW Dowanol DPnB). This vehicle comprises a boiling point equal to 230° C., molecular weight equal to 190 g/mol and viscosity at 40° C. equal to 3.4 cSt.

The solid part comprises particles having a maximum dimension equal to 1.2 µm with the following granulometric distribution: Dv (10) of 0.30 µm, a value of Dv (50) of 0.34 µm, a value of Dv (90) of 0.55 µm, a value of Dv (97) of 0.63 µm. The granulometry was measured with a laser diffraction granulometer (Mastersizer 3000, Malvern Panalytical).

Moreover, the additive used in sample 0 is a polyamide dispersant produced by LUBRIZOL LTD. and known by the trade name SOLSPERSE J980.

EXAMPLE 1

In the first embodiment example, the ink comprises the formulation given in Table 2.

TABLE 2

| Component | Percentage by weight (%) |
| --- | --- |
| Solid part | 42 |
| First vehicle | 32.1 |
| Second vehicle | 22.5 |
| Additive | 3.4 |

The solid part comprises particles having a maximum dimension equal to 1.2 µm with the following granulometric distribution: Dv (10) of 0.24 µm, a value of Dv (50) of 0.36 µm, a value of Dv (90) of 0.53 µm, a value of Dv (97) of 0.60 µm. The granulometry was measured with a laser diffraction granulometer (Mastersizer 3000, Malvern Panalytical).

The first vehicle comprises acetyl tributyl citrate (ATBC) having the following formula:

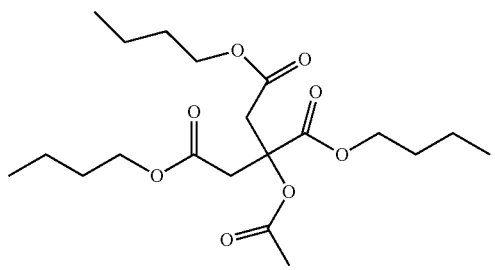 [SMILES: CCCCOC(=O)CC(CC(=O)OCCCC)(OC(C)=O)C(=O)OCCCC]

The first vehicle selected in the first example comprises a boiling point of 331° C. Moreover, the first vehicle selected in the first example comprises a molecular weight of 402.48 g/mol and a viscosity of 15.9 cSt at 40° C.

The second vehicle selected in the first example is dipropylene glycol n-butyl ether (DOW Dowanol DPnB). This vehicle comprises a boiling point equal to 230° C., molecular weight equal to 190 g/mol and viscosity at 40° C. equal to 3.4 cSt.

The additive used in the first example is a polyamide dispersant produced by LUBRIZOL LTD and known by the trade name SOLSPERSE J980.

The ink thus obtained has a viscosity of 13.9 cSt at 40° C. (measured with a rheometer of the Kinexus type from Malvern Panalytical), a surface tension of 27.5 mN/m (measured by capillary tensiometer) and a density of 1359 g/l.

Table 3 shows the results of measurements of the concentration of emissions for example 0 and for example 1, as well as the percentage change between the measured results.

TABLE 3

| Parameter | Sample 0 | Example 1 | Change relative to Sample 0 (%) |
| --- | --- | --- | --- |
| VOCs [mg/Nm$^3$] | 22.5 | 18.2 | −19.1 |
| Non-methane VOCs [mg/Nm$^3$] | 20.7 | 16.2 | −21.7 |
| Formaldehyde [mg/Nm$^3$] | 1.6 | 1.2 | −25 |
| Total aldehydes [mg/Nm$^3$] | 4.4 | 3.2 | −27.3 |
| Hydrofluoric acid [mg/Nm$^3$] | 0.6 | 0.6 | 0 |
| Odoriferous substances [ouE/m$^3$] | 1165 | 598 | −48.7 |

EXAMPLE 2

In the second embodiment example, the ink comprises the formulation given in Table 4.

TABLE 4

| Component | Percentage by weight (%) |
| --- | --- |
| Solid part | 42 |
| First vehicle | 40 |
| Second vehicle | 15 |
| Additive | 3 |

The solid part comprises particles having a maximum dimension equal to 1.2 µm with the following granulometric distribution: Dv (10) of 0.24 µm, a value of Dv (50) of 0.37 µm, a value of Dv (90) of 0.54 µm, a value of Dv (97) of 0.62 µm. The granulometry was measured with a laser diffraction granulometer (Mastersizer 3000, Malvern Panalytical).

The first vehicle selected in the second example comprises dipentyl terephthalate (DPT) having the following formula:

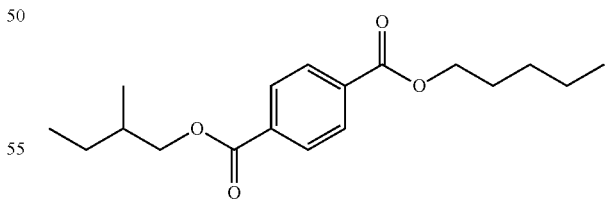

The first vehicle selected in the second example comprises a boiling point of 353° C. Moreover, the first vehicle selected in the second example comprises a molecular weight of 306.4 g/mol and a viscosity of 13.1 cSt at 40° C.

The second vehicle selected in the second example is dipropylene glycol n-butyl ether (DOW Dowanol DPnB). This vehicle comprises a boiling point equal to 230° C., molecular weight equal to 190 g/mol and viscosity at 40° C. equal to 3.4 cSt.

The additive used in the second example is a polyamide dispersant produced by LUBRIZOL LTD and known by the trade name SOLSPERSE J980.

The ink thus obtained has a viscosity of 16.4 cSt at 40° C. (measured with a rheometer of the Kinexus type from Malvern Panalytical), a surface tension of 29.2 mN/m (measured by capillary tensiometer) and a density of 1367 g/l.

Table 5 shows the results of measurements of the concentration of emissions for example 0 and for example 2, as well as the percentage change between the measured results.

TABLE 5

| Parameter | Sample 0 | Sample 2 | Change relative to sample 0 (%) |
|---|---|---|---|
| VOCs [mg/Nm³] | 22.5 | 19.3 | −14.2 |
| Non-methane VOCs [mg/Nm³] | 20.7 | 17.6 | −15.0 |
| Formaldehyde [mg/Nm³] | 1.6 | 0.9 | −43.8 |
| Total aldehydes [mg/Nm³] | 4.4 | 2.9 | −34.1 |
| Hydrofluoric acid [mg/Nm³] | 0.6 | 0.5 | −16.7 |
| Odoriferous substances [ouE/m³] | 1165 | 408 | −65.0 |

As can be seen from the results given in Table 3 and in Table 5, the use of inks according to preferred embodiments of the ink makes it possible to lower the emissions of odoriferous substances by more than 40% relative to the conventional inks. Moreover, the inks according to the invention make it possible to lower the emissions of VOCs by at least 15% relative to the conventional inks, while the reduction in emissions of aldehydes and formaldehyde is greater than 25%.

Numerous modifications and variants of the invention thus conceived are possible, all within the scope of the inventive concept.

EXAMPLE 3

In the third example, the ink comprises the formulation given in Table 6.

TABLE 6

| Component | Percentage by weight (%) |
|---|---|
| Solid part | 45 |
| First vehicle | 51.4 |
| Additive | 3.6 |

The solid part comprises particles having a maximum dimension equal to 1.2 μm with the following granulometric distribution: Dv (10) of 0.24 μm, a value of Dv (50) of 0.36 μm, a value of Dv (90) of 0.53 μm, a value of Dv (97) of 0.60 μm. The granulometry was measured with a laser diffraction granulometer (Mastersizer 3000, Malvern Panalytical).

In this third example, according to the sixth embodiment of the invention, the first vehicle comprises a mixture comprising an esterified terephthalates and a trimethylolpropane esters. In particular, the esterified terephthalates is dipentyl terephthalate (DPT) and the trimethylolpropane esters comprises 1,1,1, tris-(hydroximethyl)-propane triheptanoate.

1,1,1, tris-(hydroximethyl)-propane triheptanoate comprises a boiling point of 530° C., a molecular weight of 470.682 g/mol and a viscosity of 14 cSt at 40° C. The 1,1, tris-(hydroximethyl)-propane triheptanoate has the formula:

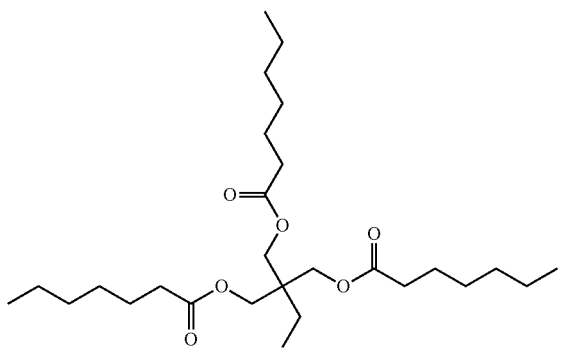 [SMILES: CCCCCCC(=O)OCC(CC)(COC(=O)CCCCCC)COC(=O)CCCCCC]

DPT has a boiling point of 353° C., a molecular weight of 306.4 g/mol and a viscosity of 13.1 cSt at 40° C.

The additive used in the first example is a polyamide dispersant produced by LUBRIZOL LTD and known by the trade name SOLSPERSE J980.

The ink thus obtained has a surface tension of 28.1 mN/m (measured by capillary tensiometer) and a density of 145 g/l.

EXAMPLE 4

In the fourth example, the ink comprises the formulation given in Table 7.

TABLE 7

| Component | Percentage by weight (%) |
|---|---|
| Solid part | 40 |
| First vehicle | 31.7 |
| Second vehicle | 24.6 |
| Additive | 3.7 |

The solid part comprises particles having a maximum dimension equal to 1.2 μm with the following granulometric distribution: Dv (10) of 0.24 μm, a value of Dv (50) of 0.36 μm, a value of Dv (90) of 0.53 μm, a value of Dv (97) of 0.60 μm. The granulometry was measured with a laser diffraction granulometer (Mastersizer 3000, Malvern Panalytical). This fourth example has the peculiarity that the solid part comprises as major component, for example it is substantially composed by, Calcium Silicate (Wollastonite) as flux component. In this case the ink it is used as a glue for the application of a grit on the surface of ceramic tiles. In practice the grit is provided in solid form on the surface of the tile after printing of the ink so that the grit stick to the ink on the surface of the tile. The flux can help smelting of the grit. This kind of inks are also known as digital ceramic glues.

The first vehicle selected in the fourth example comprises dipentyl terephthalate (DPT) having the following formula:

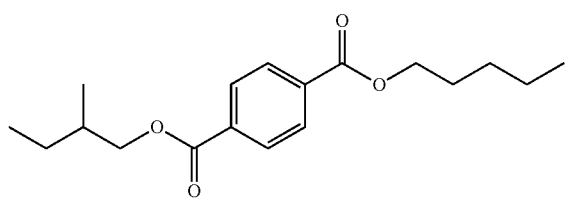 [SMILES: CCCCCOC(=O)c1ccc(C(=O)OCC(C)CC)cc1]

The first vehicle selected in the second example comprises a boiling point of 353° C. Moreover, the first vehicle selected in the second example comprises a molecular weight of 306.4 g/mol and a viscosity of 13.1 cSt at 40° C.

The second vehicle selected in the second example is dipropylene glycol n-butyl ether (DOW Dowanol DPnB). This vehicle comprises a boiling point equal to 230° C., molecular weight equal to 190 g/mol and viscosity at 40° C. equal to 3.4 cSt.

The additive used in the second example is a polyamide dispersant produced by LUBRIZOL LTD and known by the trade name SOLSPERSE J980. In this case the additive comprises also an organic pigment, for example being 0.5 wt % of the ink. The organic pigment act as a marker to see where the glue has been printed.

The ink thus obtained has a surface tension of 31 mN/m (measured by apillary tensiometer) and a density of 1300 g/l.

The invention claimed is:

1. A ceramic inkjet ink comprising a solid part provided with at least one ceramic component and a liquid part provided with at least one first vehicle and a second vehicle,
wherein said first vehicle comprises one or more esterified terephthalates, cyclohexane dicarboxylates, trimethylolpropane esters, and/or fatty acid esters of aromatic alcohols, and
wherein said second vehicle comprises one or more glycol ethers, glycol ether acetates and/or fatty acid esters, in which the first vehicle represents at least 10 wt % relative to the total weight of the ink.

2. The ink according to claim 1, in which the esterified terephthalates have the general formula:

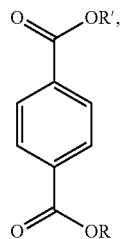

in which the cyclohexane dicarboxylates have the general formula:

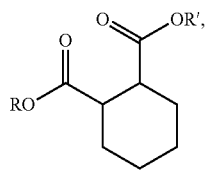

in which the trimethylolpropane esters have the general formula:

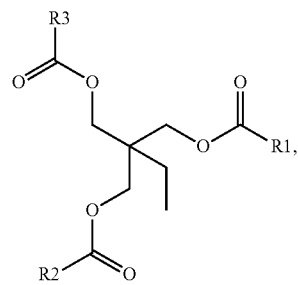

in which the fatty acid esters of aromatic alcohols have the general formula:

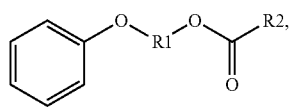

and in which R, R', R1, R2 and R3 comprise a linear or branched aliphatic group.

3. The ink according to claim 1, in which said first vehicle has a boiling point above 250° C.

4. The ink according to claim 1, in which the content of the second vehicle is less than 30 wt % relative to the total weight of the ink.

5. The ink according to claim 1, comprising at least one additive, in which said additive comprises one or more dispersants, surfactants, viscosity modifiers, suspending agents, wetting agents, antifoaming agents, moistening agents, biocides, adhesion promoters, glue and/or colorants.

6. The ink according to claim 5, in which the content of the additive is less than 5 wt % relative to the total weight of the ink.

7. The ink according to claim 1, in which the first vehicle represents at least 30 wt % relative to the total weight of the ink.

8. The ink according to claim 1, in which the first vehicle represents at least 50 wt % relative to the total weight of the ink.

9. The ink according to claim 1, in which the first vehicle has a kinematic viscosity in a range of 1 cSt and 40 cSt at 40° C.

10. The ink according to claim 1, in which the first vehicle has a kinematic viscosity in a range of 2 cSt and 30 cSt at 40° C.

11. The ink according to claim 1, in which the first vehicle has a kinematic viscosity in a range of 3 cSt and 20 cSt at 40° C.

* * * * *